United States Patent [19]
Bieneck

[11] Patent Number: 4,881,431
[45] Date of Patent: Nov. 21, 1989

[54] METHOD OF MAKING A SINTERED BODY HAVING AN INTERNAL CHANNEL

[75] Inventor: Jürgen Bieneck, Essen, Fed. Rep. of Germany

[73] Assignee: Fried. Krupp Gesellscahft mit beschränkter Haftung, Essen, Fed. Rep. of Germany

[21] Appl. No.: 197,264

[22] Filed: May 23, 1988

Related U.S. Application Data

[62] Division of Ser. No. 3,262, Jan. 14, 1987, Pat. No. 4,813,823.

[30] Foreign Application Priority Data

Jan. 18, 1986 [DE] Fed. Rep. of Germany ....... 3601385

[51] Int. Cl.$^4$ .......................... B21K 5/04; B22F 7/06
[52] U.S. Cl. ................................ 76/108 R; 76/108 T; 408/144; 419/6
[58] Field of Search ..................... 228/174, 155, 161; 76/108 R, 108 T; 408/144; 419/8, 6

[56] References Cited

U.S. PATENT DOCUMENTS

4,059,031 11/1977 Erdelyi ........................... 76/108 R
4,698,205 10/1987 Oskarsson et al. ............ 76/108 R X
4,704,055 11/1987 Guhring ......................... 408/144 X

FOREIGN PATENT DOCUMENTS

197706  6/1977 U.S.S.R. ........................... 76/108 R
197709  9/1977 U.S.S.R. ........................... 76/108 T
2017153 10/1979 United Kingdom .................... 419/8

Primary Examiner—Kenneth J. Ramsey
Attorney, Agent, or Firm—Spencer & Frank

[57] ABSTRACT

A drilling tool having at least one helical fluid flow channel at its interior, composed of a hard metal core having an exterior surface and a hard metal tubular casing having an interior surface, the casing enclosing the core with their surfaces in firm contact so that the core and casing form a composite body, each channel being formed as a groove in the surface of the core or casing.

A method for manufacturing a sintered body having at least one internal channel, by providing a hard metal core having an exterior surface; providing a sinterable and heat shrinkable hard metal tubular casing having an interior surface which initially encloses a region larger in cross section than the core; forming in the surface of the core or casing at least one groove corresponding to the at least one channel; inserting the core into the casing after the step of forming a groove; and after the step of inserting, finish sintering at least the casing and shrinking the casing for bonding the core and casing together at the surfaces by diffusion.

An extrusion molding tool for forming an extruded member having a helical surface groove from a blank forced through the tool, the tool including: a die; a mandrel disposed to be enclosed by the die; and a radially protruding web mounted on the surface of the die or mandrel and having a helical form in the direction in which the blank is forced through the tool.

21 Claims, 8 Drawing Sheets

METHOD OF MAKING A SINTERED BODY HAVING AN INTERNAL CHANNEL

This is a Division of application Ser. No. 003,262 filed Jan. 14, 1987, and now U.S. Pat. No. 4,813,823.

The present invention relates to a method of producing sintered bodies having internal flushing medium channels and to an extrusion molding tool for implementing the method as well as a drilling tool.

European Patent Application 118,035 discloses a drilling tool having a metal drill bit holder on which is placed a sintered metal drill bit having at least one helical internal cooling channel. To manufacture the drill bit, it is proposed to use a bit blank having linear cooling channel recesses and, after sintering the blank under the influence of temperature, twist it to produce the desired helical cooling channels. This is done in that the helical cooling channels are produced by twisting the sintered metal blank as it leaves the extrusion molding device at an angular velocity which is adapted to the flow of material, the desired drill geometry and the pitch of the helix of the cooling channels, with care being taken to guide the sintered metal blank in a steady and axially uniform manner and also to make the twisting moement continuous and steady.

However, in practice, the hard metal drills produced in this manner exhibited cooling channels whose diameter and helical shape are irregular. The same problems occurs, in general, with other sintered bodies equipped with internal bores, particularly if such bores or not linear. As for the drilling tool, its manufacture requires additional twisting devices and appropriate control and regulating members.

SUMMARY OF THE INVENTION

It is therefore an object of the invention to provide a drilling tool which has at least one helical, internal flushing medium channel, with merely the selection of material and the selection of the geometry of this drilling tool resulting in uniformly extending flushing medium channels.

It is a further object of the invention to provide a method of manufacturing sintered bodies having internal flushing medium channels which method operates without additional devices and eliminates additional method steps.

The above and other objects are achieved, according to the invention, by a drilling tool having at least one helical fluid medium flow channel at its interior, the tool comprising a first member in the form of a hard metal core having an exterior surface and a second member in the form of a hollow hard metal tubular casing having an interior surface, the second member enclosing the first member with the interior surface of the second member firmly contacting the exterior surface of the first member so that the first and second members form a composite body, wherein each channel is formed in one of the members and extends from the surface of the one member.

If the drilling tool is made of a composite hard metal body composed of a core and a tubular casing, it is possible without difficulty to produce the desired flushing medium channels entires at or in the outer face of the core and/or on the inner face of the tubular casing. In particular, it is easier to work the exterior of a solid body than to introduce nonlinear bores into a solid body.

According to one feature of the invention, the channels disposed in the core and/or in the tubular casing have an essentially tunnel-shaped cross section, with such tunnel shape possibly having mutually parallel or obliquely converging side walls. Depending on the intended purpose, it would also be possible, however, to provide semicircular, semi-elliptical or lenticular flushing medium channels.

Depending on the intended use for the drilling tool, the core and tubular casing are made of the same hard metal or of different hard metals. Preferably, the core is made of a material which is tougher than that of the tubular casing and the tubular casing is made of a type of metal which is relatively hard and more wear resistant than the hard metal of the core.

According to a further feature of the invention, the core and the tubular casing are frustoconical, preferably having a cone angle of no more than 5°.

The invention further involves a method for manufacturing a sintered body having at least one internal channel and from which the drilling tool is formed. The method includes: providing a first member of a sinterable hard metal in the form of a core having an exterior surface; providing a second member of a sinterable and heat shrinkable hard metal in the form of a hollow tubular casing having an interior surface which initially encloses a region larger in cross section than the first member; forming in the surface of one of the members at least one groove corresponding to the at least one channel; inserting the first member into the second member after the step of forming a groove; and after the step of inserting, finish sintering at least the second member and shrinking the second member for bonding the members together at the surfaces by diffusion to form a composite member.

The significant feature of this method is to provide each one of the desired internal flushing medium channels in the form of a groove at the exterior of a core and/or on the inner face of a tubular casing, with possibly two grooves being disposed opposite one another in the core and in the tubular casing, respectively, and forming one flushing medium channel, whereupon the tubular casing is pushed over the core and the two pieces are finish sintered to form a composite body. During this process, the tubular casing is shrunk onto the core or the two parts are connected with one another at their contacting edge faces by way of diffusion processes.

As already mentioned above, at least one groove is produced in the exterior face of the core and/or in the interior face of the tubular casing before the parts are jointly sintered, with such groove basically having a semi-circular, or semi-elliptical, or lenticular, or almost circular cross section. However, other shapes, with a tunnel-shaped groove being preferred, are also possible.

If the above-mentioned shrinking or shrink fitting, treatment is selected, a further feature of the invention provides that the cross section of the opening of the casing is given a size, before sintering, which is at least large enough to enable the core to be inserted but which exceeds the dimension of the core cross section by no more than 35%. Preferably, the casing cross section is 10 to 20% larger than the core cross section. After sintering at 1250° to 1500° C., preferably at 1300° C., such composite hard metal bodies can be further compressed thermo-isostatically in a manner known in the art.

The particular advantage of the process disclosed, in principle, already in FRG DE-A1 2,810,746 is that by maintaining the above-mentioned shrinkage dimensions of the pressed member with respect to the sintered member there surprisingly results an intimate bond between the two without damaging influences, such as crack formation, taking place. Since sintering temperatures and times in the manufacture of hard metals are greatly dependent upon the binder and binder content, the grain sizes of the carbide employed and on the chemical composition, fine-grained alloys having a low Co content require much higher sintering temperatures than those having coarse carbide grains and a high Co content.

According to another feature of the invention, the core is finish sintered after at least one groove has been made in the core and/or in the tubular casing, and before the core and the unsintered tubular casing, that has been pushed over the core, are sintered together. Here again, different sintering temperatures can be utilized for the core material and for the casing material.

Changes in the sintered surface, for example due to oxides or other impurities, which could adversely influence the subsequent sintering process, are removed by means of mechanical or chemical surface treatments after the first sintering process.

The manufacture of the core is in no way limited to one manufacturing process. For example, the core which is provided with the groove can be smooth pressed or extrusion molded, injection molded, or slip cast or can be made by way of machining from an isostatically produced pressed body.

If one produces a sintered or unsintered core and/or a tubular casing which has at least one linear groove made by machining, the core and/or the tubular casing can be thermally twisted in a manner known in the art. A preferred manner of twisting is achieved by the use of an extrusion molding tool composed of: a hollow die having an interior surface; a mandrel having an exterior surface and disposed to be enclosed by the die; and a radially protruding web mounted on one of the surfaces, the web having a helical form in the direction in which a blank is forced through the tool to form the core or casing. The means for twisting is used simultaneously to make the helical groove.

Since the twisting is effected simultaneously with the extrusion molding by way of a guide web or webs, the twisting is no longer dependent upon extraneous parameters such as the material flow velocity in the extrusion mold. Moreover, a uniform pitch of the helix in the hard metal is always realized, indepedently of the velocity with which the die presses the material into through the nozzle. Uniformity of pitch is increased if guidance by way of the above-mentioned helix-forming webs is effected over at least 90°, and preferably over at least 180°. For reasons of apparatus, manufacture and process technology, a guidance, i.e. a web, is preferred which has a semi-circular cross section with a radius of 0.5 to 1 mm.

Experience has shown that the pitch angle of the helical web in the nozzle should be selected somewhat larger than the angle later desired for the helical groove in the core. Generally, the correction angle is about 3° to 7°, so that the different shrinking in radial and axial direction is compensated.

The extrusion molding tool proposed according to a further feature of the invention for the production of the helical grooves comprises a possible exchangeable nozzle having at least one web extending helically in the direction of extrusion. For the production of the tubular casings, mandrel and nozzle can be exchanged, with the mandrel having the above-mentioned web or webs. Preferably, helix-forming webs are employed which, when projected, axially, describe an arc of more than 90°, preferably more than 180°, and which have a semi-circular or tunnel-shaped cross section. Advantageously, the extrusion molding tool has a simple structure, but nevertheless eliminates the need for the otherwise required additional twisting devices.

BRIEF DESCRIPTION OF THE DRAWING

FIG. 8b is a cross-sectional view along line VIIIb—VIIIb in FIG. 8a.

DESCRIPTION OF THE PREFERRED EMBODIMENTS

Figure 1A:
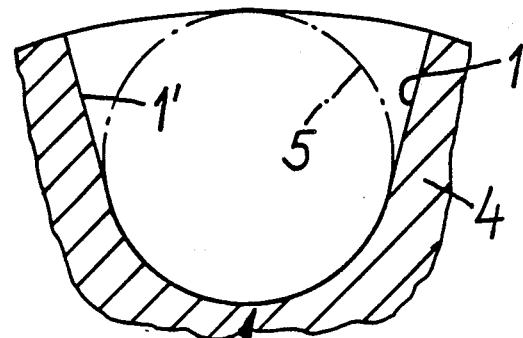
FIGS. 1a to 1d are cross-sectional views of flushing medium channels in a core which is part of a composite body, such as a drilling tool blank, according to the invention.
Figure 1B:
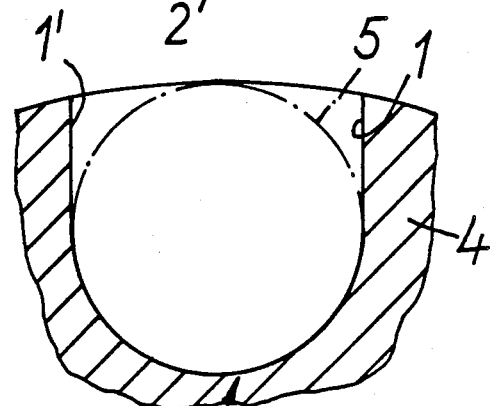
Figure 1C:
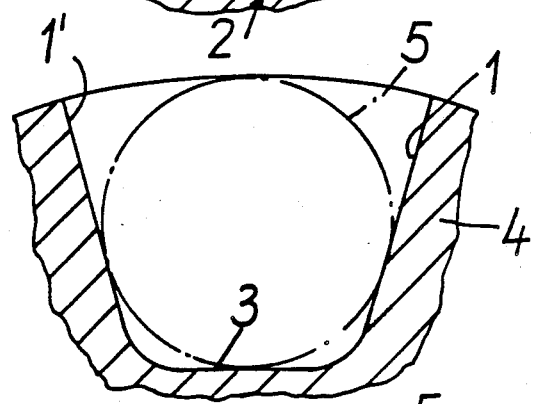
Figure 1D:
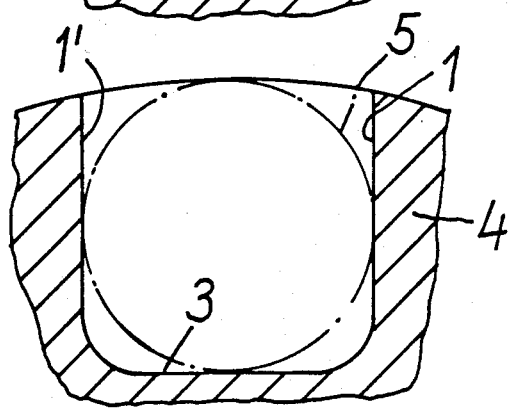

Favorable flushing medium channel cross sections according to the invention are shown in FIGS. 1a to 1d. The cross sections of the flushing medium channels correspond to upside-down tunnel shapes, with the tunnel side walls 1, 1' being parallel, as shown in FIGS. 1b and 1d, or conically tapered toward the top of the tunnel or toward the tunnel bottom, as shown in FIGS. 1a and 1c, respectively. The base, or roof, of the tunnel may have a rounded, or semicircular, shape 2, as in FIGS. 1a and 1b, or a planar shape 3, as in FIGS. 1c and 1d. The illustrated cross-sectional configurations of the channels, which extend in the form of helixes along the circumferences of core 4 and which constitute the later flushing agent channels, cover more area than the full circle 5 shown in the drawing. However, depending on the case at hand, semi-circular, semi-elliptical or lenticular groove cross sections having about one-half the cross-sectional area can also be used. The same flushing medium cross sections can also be introduced in the interior faces of the tubular casing instead of in core 4.

Figure 2A:
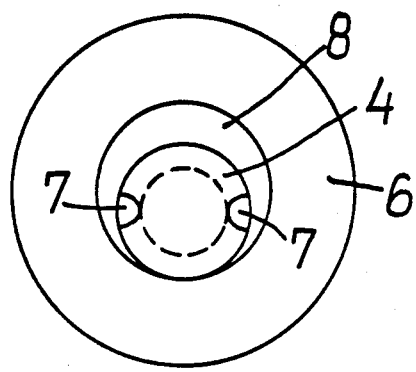
FIGS. 2a and 2b are axial end views of such composite body with presintered core before and after final finish sintering.
Figure 2B:
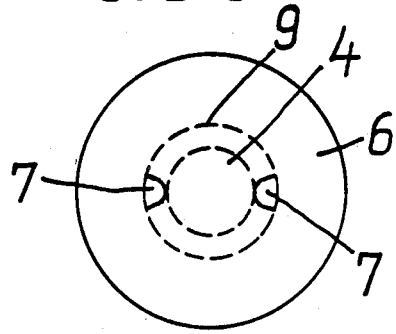
Figure 2C:
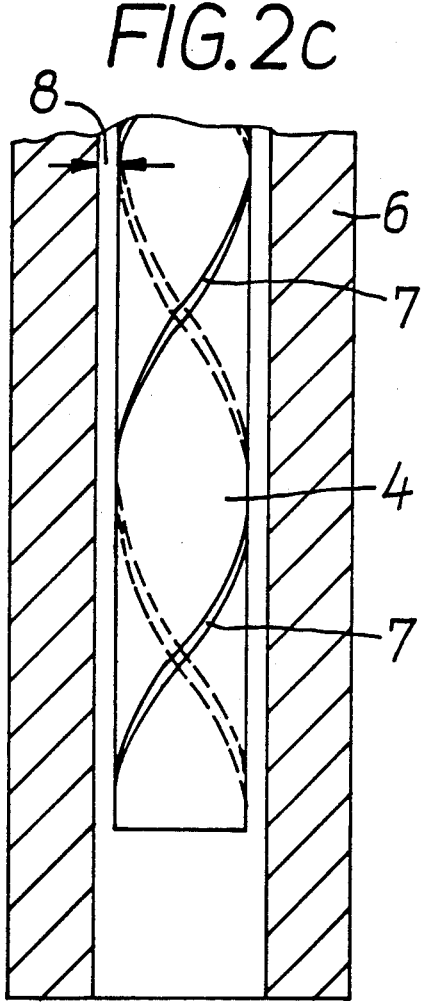
FIGS. 2c and 2d are longitudinal cross-sectional views of the composite body before and after the final finish sintering.

FIGS. 2a and 2c show two telescoped parts, a core 4 and a tubular casing 6 fitted together, the tubular casing 6 being unsintered and the core 4 being already finish sintered and having been provided with two helically extending grooves 7 as rinsing agent channels having the form of FIG. 1a or 1b, before the final sintering.

Before final sintering, core 4 may be surface treated, for example by grinding, sand blasting, etching etc., so that no oxides or other impurities from the sintering or diffusion process will have any qualitative influence on the finished product. Core 4 may be produced before the first sintering, for example by smooth pressing, extrusion molding, machining a pressed body that has been produced hot isostatically, injection molding, or slip casting.

Rinsing channels 7 may here be pressed, molded, or machined into the unsintered or sintered core or, as disclosed, for example in European Application 118 035, be cut linearly with or without chip removal and then be twisted.

According to a particularly suitable process, the helical flushing medium channels are produced already during the extrusion molding process, which will be discussed below with reference to FIGS. 6, 7a and 7b.

The core material may be, for example, an alloy composed of 94% WC and with an initial grain size of 1.2μ, and 6% Co, which alloy is sintered at 1540° C.

The tubular casing 6, however, is composed, for example, of an alloy composition of 92% WC with an initial grain size of 3.5μ and 8% Co. Casing 6 has an opening which exceeds the cross section of core 4 by a selected allowance area 8. The tubular casing 6 may be shaped by extrusion molding, by cutting of isostatically produced blanks, or by injection molding or slip casting. Of course, the quality of the tools can be improved by employing hot isostatic pressing treatments for the purpose of further compression either after the sintering process or simultaneously with the finish sintering.

Figure 2D:
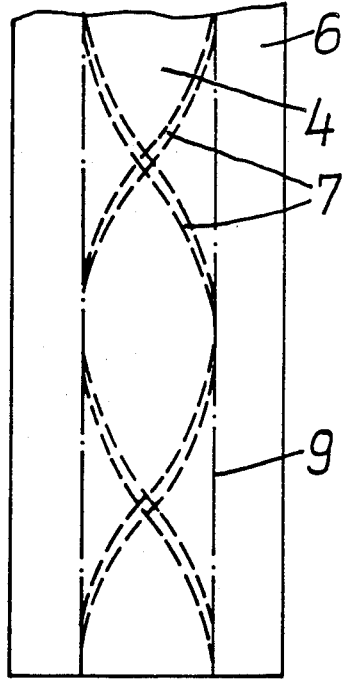

The two pushed-together members 4 and 6 are sintered together at 1420° C., resulting in the composite product shown in FIGS. 2b and 2d. Core 4 and tubular casing 6 form a firmly seated composite body via a common diffusion surface 9. In dimensioning core 4 before it is sintered for the first time, it must be noted that a considerably amount of shrinkage (also in length) may result during sintering so that, as can be seen in FIG. 2c, the fit position of core 4 relative to tubular casing 6 with respect to the later drill bit 10 must be considered.

As is known from the prior art, after finish sintering the composite bodies are finally worked mechanically, for example by grinding, and/or are provided with different hard substance coatings, e.g. TiC, TiN.

Figure 3A:
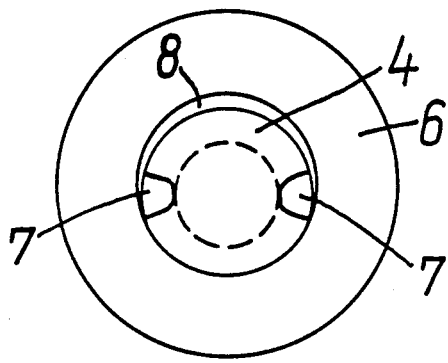
FIGS. 3a to 3d are views corresponding to FIGS. 2a to 2d, each showing an unsintered core and an unsintered tubular casing.
Figure 3B:
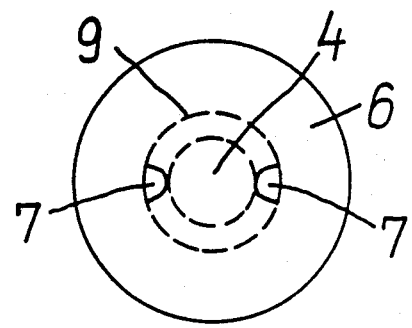
Figure 3C:
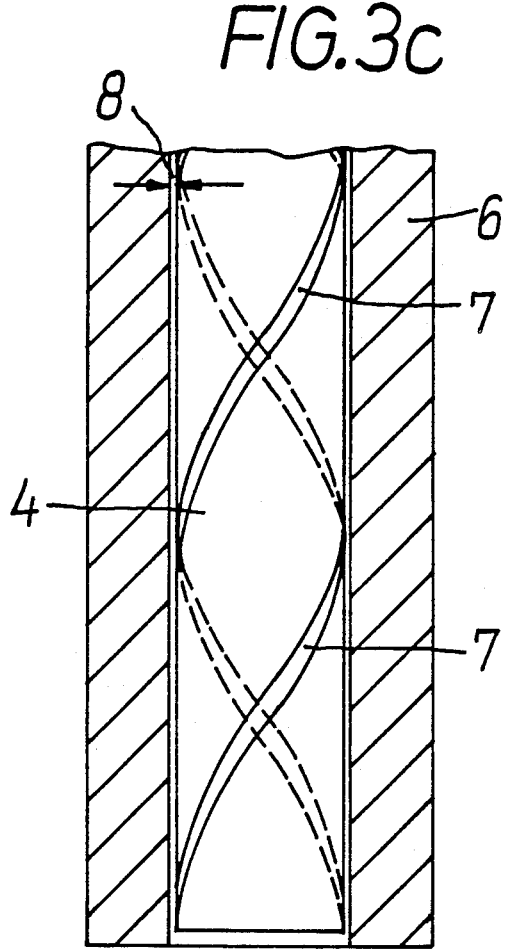
Figure 3D:
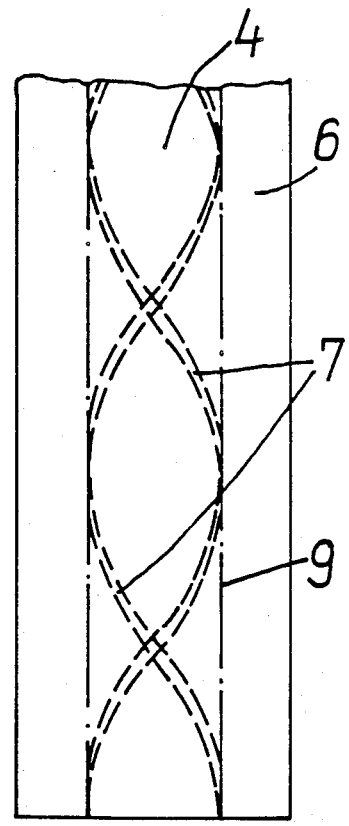

The parts shown in FIG. 3 differ from those shown in FIG. 2 only in that core and tubular casing are shown in FIGS. 3a and 3c both in the unsintered state before they are subjected to the final joint sintering. Correspondingly, with reference to the shaping processes and the selection of materials, reference can be made to the above description relating to FIG. 2. The types of hard metal can be selected in such a manner that respectively different degrees of sinter shrinkage occur in the core and in the tubular casing.

The type of hard metal for the tubular casing 6 should be selected so that during sintering it shrinks more than does core 4. With this measure it is assured that, in spite of the allowance area 8, these parts can be fit together well and that the joint sintering produces the desired diffusion surface 9.

If, for example, one selects a core having an initial outer diameter of 6 mm with a degree of shrinkage of 20%, the sintered outer core diameter is 4.8 mm. From this, with an assumed shrinkage of 22% of the tubular casing 6 and a (theoretical) inner diameter of 4.77 mm of the tubular casing after sintering, calculations show that casing 6 should have an inner diameter of 6.12 mm before sintering. This means that the fitting play 8 has a radial dimension of about 0.12 mm. The outer diameter of the tubular casing may be selected, for example, to be 10.5 mm.

Figure 4A:
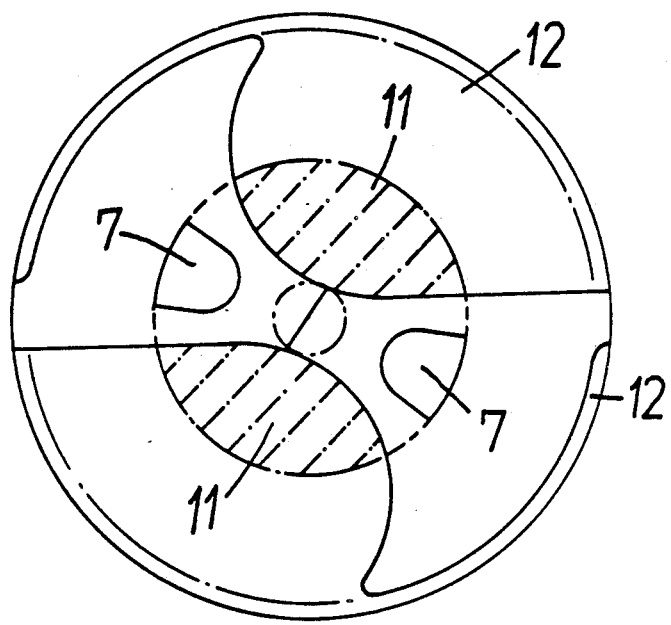
FIGS. 4a and 4b show a drill bit according to the invention in a cross-sectional view and a side view, respectively.
Figure 4B:
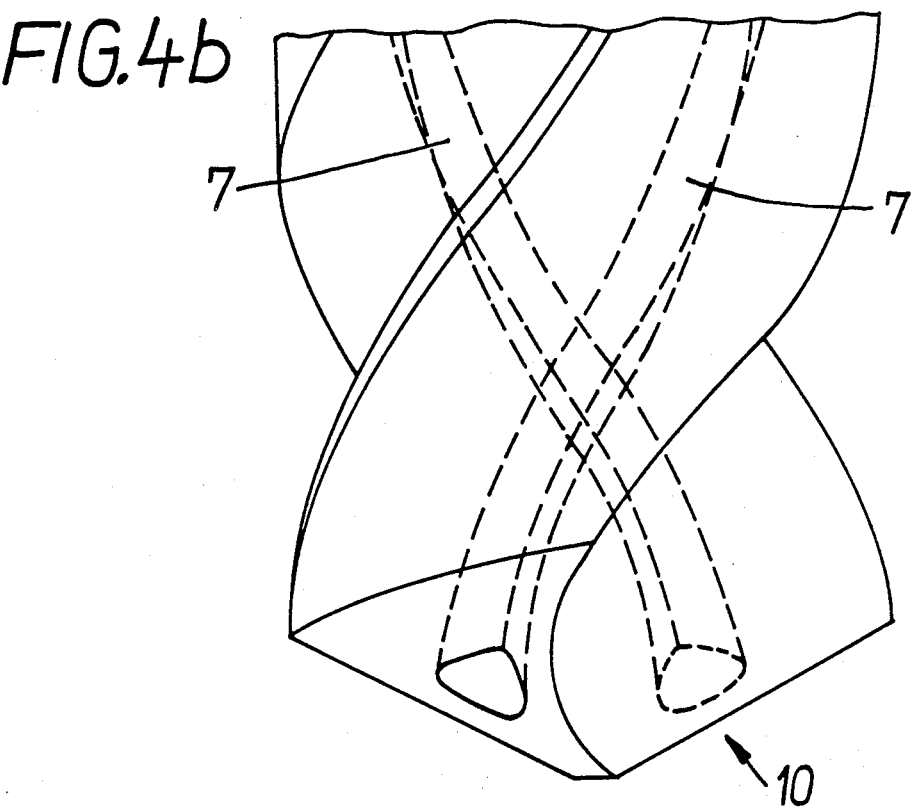

FIGS. 4a and 4b show a finished, helical drill bit 10 equipped with helical flushing medium channels 7 that were formed in core 4. The cross-sectional view of FIG. 4a shows the portions 11 of the core 4 which, in order to produce the chip collecting grooves for the bit, must be ground out or at least partially preformed with consideration of the grinding allowance and the desired length of the chip collection grooves. Also shown are portions 12 which are ground out of casing 6. The various grinding methods or other methods, such as, for example, erosion, and particularly grinding of the cutting tip, are known in the art.

Figure 4C:
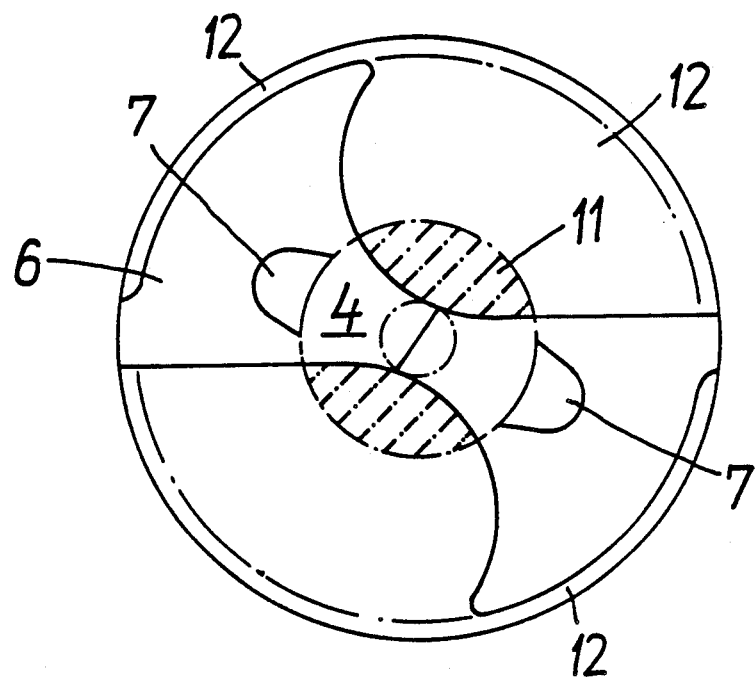
FIG. 4c is a cross-sectional view of a drill bit having flushed medium channels in the interior face of the tubular casing.

In FIG. 4c, the channels 7 have been formed in casing 6. The view of FIG. 4c is otherwise identical to that of FIG. 4a.

Figure 5A:
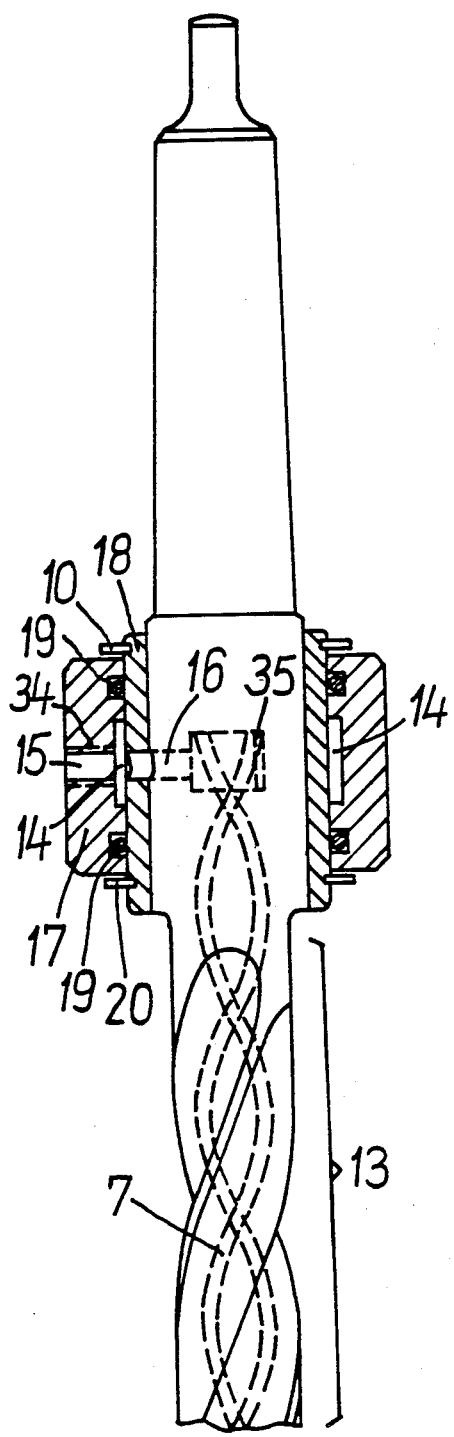
FIGS. 5a, 5b and 5c are elevational views of drilling tools according to the invention.
Figure 5B:
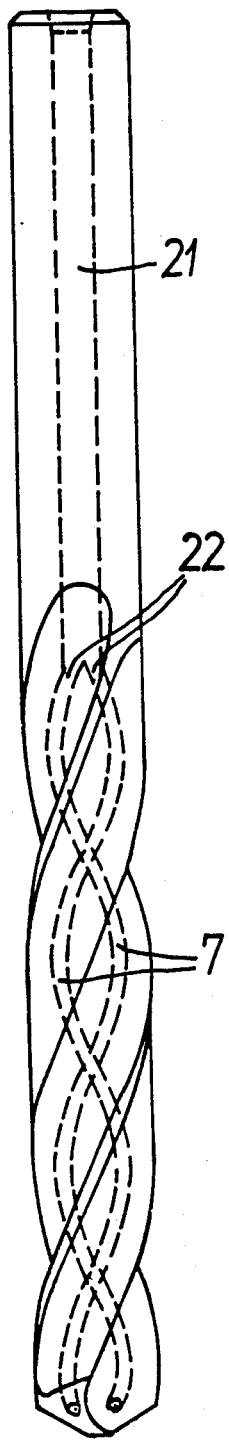
Figure 5C:
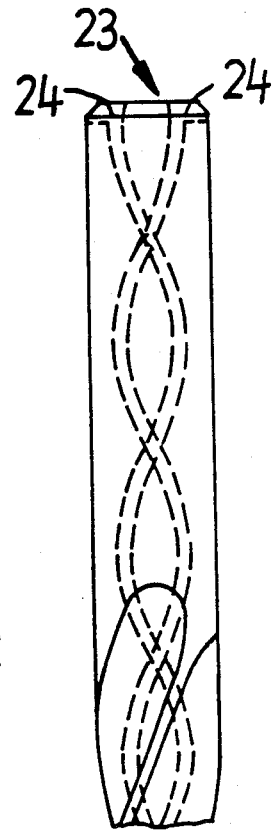

The entire drilling tool is known to be composed of a drill tip, a cutting edge guide section with chip collecting grooves, and a fastening shaft. FIGS. 5a to 5c, in particular, show various examples of how the flushing medium is supplied from outside of the drill bit of FIGS. 4a, 4b and 4c.

According to the version shown in FIG. 5a, an outer annular guide channel 14 is employed which is connected, via a connecting bore 34 with a flushing, lubricating, or cooling, medium inlet 15. The flushing medium can reach the helical flushing or lubricating agent channels 7 by means of one or a plurality of outlets 16 or the flushing medium passes through an outlet 16 into a circumferential groove 35 originally formed in core 4. In a manner known in the art, a flushing medium supply jacket 17, a bearing bush 18, conventional shaft seals 19, e.g. O-rings, and shaft securing means 20, e.g. circlip securing rings, are used as fastening means.

In the embodiment shown in FIG. 5b, the helical flushing medium channels 7 end in a central bore 21 originally formed in the core in the region constituting the fastening shaft. The connection of the helical flushing agent channels 7 with this central bore 21 is produced by oblique or radial connecting bores 22. It is, however, also possible to have the helical flushing medium channels 7 extend to the end 23 of the fastening shaft, as shown in FIG. 5c, and to supply and discharge fluid through radial transverse channels 24, with the advantage of a continuous leading for the flushing medium. This embodiment is further easily to produce. However, it is also possible to bring radial transverse channels inwardly into a central bore.

Figure 6:
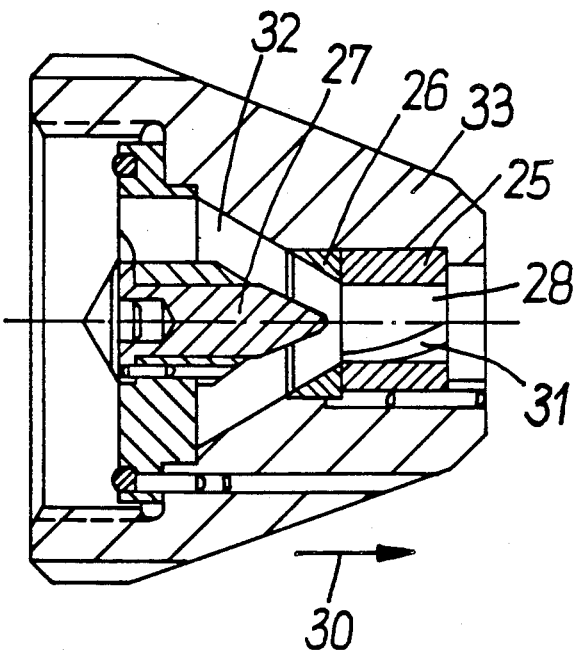
FIG. 6 is a cross-sectional view of an extrusion molding tool according to the invention.
Figure 7A:
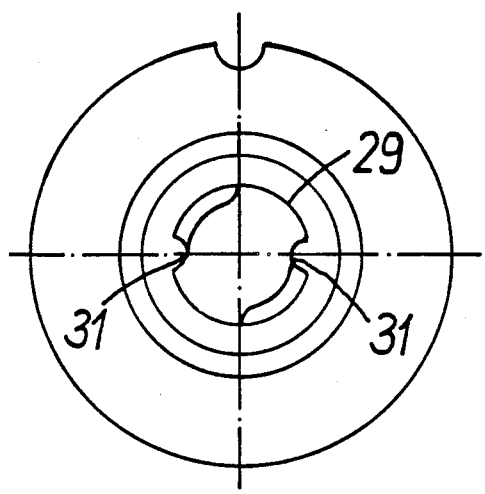
FIGS. 7a and 7b are sectional views of a nozzle of the extrusion molding tool of FIG. 6.
Figure 7B:
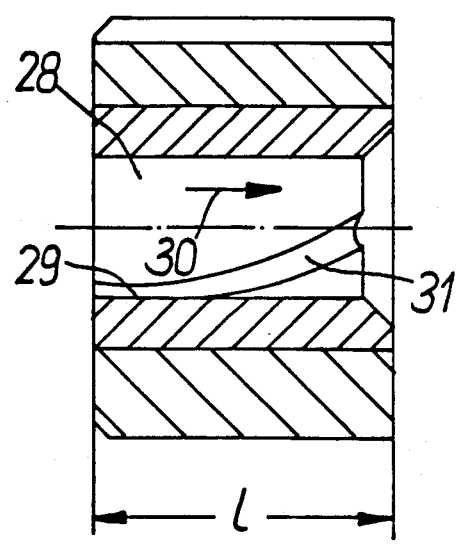

FIG. 6 shows an extrusion molding tool according to the invention which is composed essentially of a die, or nozzle, 25, an inlet nozzle 26 connected upstream of nozzle 25, a mandrel 27 and a nozzle mount 33. Nozzle 25 is shown in greater detail in FIGS. 7a and 7b and is composed of a cylindrical ring providing a cylindrical inner nozzle chamber 28 delimited by an inner casing face 29. This inner casing face 29 of the nozzle is provided with two radially inwardly projecting webs 31 extending helically in extrusion direction 30. Each web 31 has a circumferential extent of a quarter circle (90°) over the length of the nozzle.

The webs have, in cross-sectional planes perpendicular to the nozzle axis, a semicircular shape or are of the shapes shown in FIGS. 1a to 1d. The radius of the semicircular shape or of the circle 5 inscribed in that shape, depends essentially on the size of the drill, e.g. about 0.5 to 1 mm.

Upstream of nozzle 25 is inlet nozzle 26 which has a conical inlet funnel for the material to be pressed. The minimum radius of nozzle 26 corresponds approximately to the radius of the nozzle 25. In the illustrated embodiment, the opening angle of the inlet funnel 26 is about 70°. If one intends to press solid bodies, such as core 4, mandrel 27 of the injection molding tool may be omitted.

Mandrel 27 is disposed in an axially centered manner with respect to inlet nozzle 26 and nozzle 25, with the tip of mandrel 27 lying slightly upstream of the interior 28 of the nozzle.

The above-mentioned parts are fastened in the nozzle mount 33 in a manner known in the art.

The method according to the invention in which grooves for the later flushing medium channels 7 and for the chip collecting chambers 11 are produced in the core already during the extrusion molding process, is performed as follows.

A hard metal block of the material selected for core 4 is pressed by a stamp (not shown) in the direction of arrow 30 into a chamber 32 formed between mandrel 27 and nozzle mount 33 and inlet nozzle 26 where the hard metal is compressed. The actual molding takes place in two ways in the interior 28 of nozzle 25. During advance of the material through nozzle 25, the hard metal is given a cylindrical shape while webs 31 each produce a helical groove in the circumference of the extruded hard metal and thus simultaneously cause the extruded product coming out of nozzle 25 to rotate about its longitudinal center axis.

The described method of producing the core 4 advantageously results in unform helixes, eliminates additional process phases and reduces the required grinding work to produce flushing medium channels 7. The thus produced core 4 together with tubular casing 6 is finish sintered as described above.

Tubular casing 6 can also be produced by the above described extrusion molding process, possibly with grooves in its interior surface. This merely requires a differently shaped mandrel 27 whose tip then protrudes into the nozzle interior 28 and which has a diameter corresponding to the inner diameter of the tubular casing 6. If the inner face is to be provided with grooves, it is not die 25, as described above, but mandrel 27 which is provided with one or more helical webs.

Of course, core 4 and tubular casing 6 may also be produced by other methods. In particular, it would possibly be feasible to preshape the later chip collecting chambers in core 4, i.e. the surfaces 11 in FIG. 4a.

Flushing medium channels 7—particularly if their diameter is larger—may also be formed in the interior face of tubular casing 6, or in both core 4 and casing 6, by machining, grinding, broaching, deforming while in a plastic state. slip casting, or injection molding.

Figure 8A:
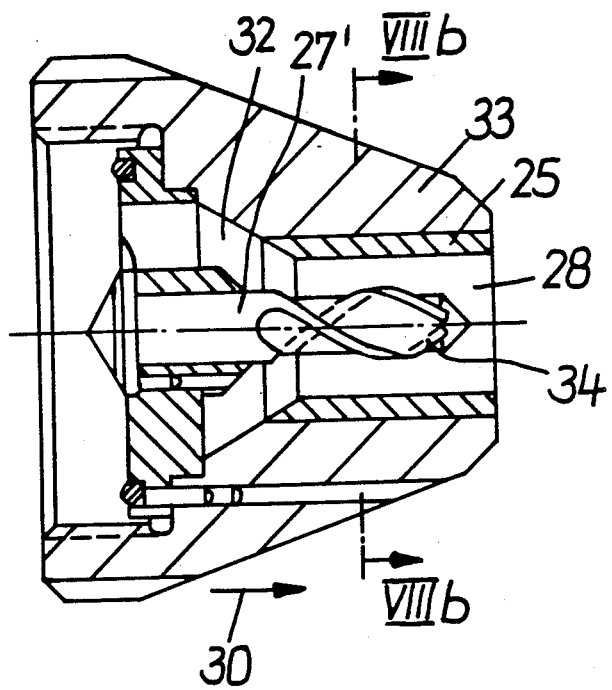
FIG. 8a is a cross-sectional view of an extrusion molding tool having a mandrel with a radially protruding web mounted on its surface.
Figure 8B:
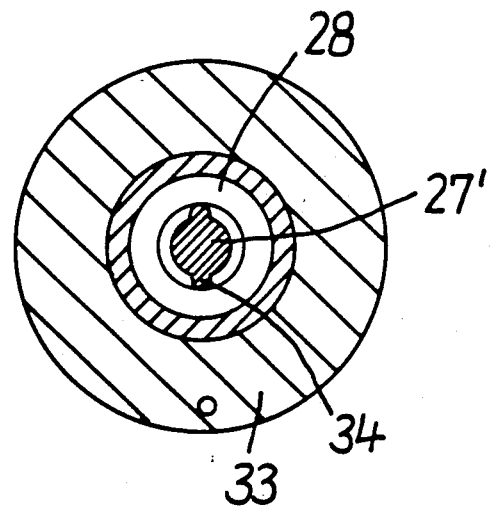

In the extrusion molding tool shown in FIGS. 8a and 8b the mandrel 27' has radially protruding webs 34 on its exterior surface. The webs extend helically in extrusion direction and have a circumferential extend of a half circle (180°) over the length of the nozzle.

It will be understood that the above description of the present invention is susceptible to various modifications, changes and adaptations, and the same are intended to be comprehended within the meaning and range of equivalents of the appended claims.

The present disclosure relates to the subject matter disclosed in Federal Republic of Germany, No. P 36 01 385.4 of Jan. 18, 1986, the entire specification of which is incorporated herein by reference.

What is claimed is:

1. A method for manufacturing a sintered body having a longitudinal axis and at least one internal channel spaced from the axis, comprising:
   providing a first member of a sinterable hard metal in the form of a core having an exterior surface;
   providing a second member of a sinterable and heat shrinkable hard metal in the form of a hollow tubular casing having an interior surface which initially encloses a region larger in cross section than said first member;
   forming in said surface of one of said members at least one groove corresponding to the at least one channel;
   inserting said first member into said second member after said step of forming a groove; and
   after said step of inserting, finish sintering at least said second member and shrinking said second member for bonding said members together at said surfaces by diffusion to form a composite member.

2. A method as defined in claim 1 wherein the cross section of the region enclosed by said interior surface of said second member is dimensioned, before said step of finish sintering, to be large enough that it is possible to push in said first member; and further wherein the dimension of the cross section of said region exceeds the dimension of the cross section of said first member by not more than 35%.

3. A method as defined in claim 2 wherein the cross section of the opening of said second member, before said step of finish sintering, is 10 to 20% larger than the cross section of said first member.

4. A method as defined in claim 1 wherein said surfaces are initially conical.

5. A method as defined in claim 1 further comprising, after said step of finish sintering, hot isostatically compressing the composite body at 1250° to 1500° C.

6. A method as defined in claim 5 wherein said step of hot isostatically compressing is carried out at 1300° C.

7. A method as defined in claim 1, wherein said step of forming at least one groove is carried out to form a helical groove, and further comprising, before said step of inserting, finish sintering said first member.

8. A method as defined in claim 7 further comprising surface treating said first member after said finish sintering thereof so as to mechanically or chemically remove oxides or other impurities which adversely influence subsequent sintering of at least said second member.

9. A method as defined in claim 1 wherein one of said providing steps is carried out by smooth pressing, extrusion molding, injection molding, slip casting or machining of an isostatically produced blank.

10. A method as defined in claim 9 wherein said step of forming at least one groove is carried out by forming a linear groove by machining, and then thermally twisting said one member.

11. A method as defined in claim 7 wherein said steps of providing the one of the members and forming a groove comprise:

providing an extrusion molding tool composed of a first part constituting a hollow die, a second part constituting a mandrel enclosed by the first part, and an extrusion mold guide, with one of the parts being provided with a radially protruding, helically extending, groove-forming web;

heating a hard metal blank to its extrusion molding temperature; and forcing the heated blank through the tool for causing the hard metal of the blank to be twisted in the form of a helix while a groove is formed therein by the web.

12. A method as defined in claim 11 wherein the web extends circumferentially around its associated part through an angle of at least 90°.

13. A method as defined in claim 12 wherein the angle is at least 180°.

14. A method as defined in claim 11 wherein the web has a semicircular cross section with a radius of 0.5 to 1 mm.

15. A method as defined in claim 11 wherein the web has a spiral pitch slightly greater than the spiral pitch of the internal channel in the finished composite manner.

16. A method as defined in claim 1, wherein the groove has a helical course, a bottom of circularly arcuate cross section and two opposite side walls extending from the bottom divergently relative to one another as viewed in cross section.

17. A method as defined in claim 1, wherein the groove has a helical course, a bottom of semicircular cross section and two opposite parallel side walls extending from the bottom.

18. A method as defined in claim 1, wherein the groove has a helical course, a planar bottom and two opposite side walls extending from said bottom divergently relative to one another as viewed in cross section.

19. A method as defined in claim 18, wherein each said side wall joins the bottom in a rounded corner.

20. A method as defined in claim 1, wherein the groove has a helical course, a planar bottom and two opposite parallel side walls extending from said bottom.

21. A method as defined in claim 20, wherein each said side wall joins the bottom in a rounded corner.

* * * * *